(12) United States Patent
Neren (10) Patent No.: US 9,829,719 B1
(45) Date of Patent: Nov. 28, 2017

(54) EYEGLASSES ASSEMBLY COMPRISING FRAME AND INTERCHANGEABLE SIDE PIECES

(71) Applicant: Asher Neren, Skokie, IL (US)

(72) Inventor: Asher Neren, Skokie, IL (US)

(*) Notice: Subject to any disclaimer, the term of this patent is extended or adjusted under 35 U.S.C. 154(b) by 0 days.

(21) Appl. No.: 15/225,727

(22) Filed: Aug. 1, 2016

(51) Int. Cl.
*G02C 5/14* (2006.01)
*G02C 5/22* (2006.01)

(52) U.S. Cl.
CPC .......... *G02C 5/22* (2013.01); *G02C 2200/02* (2013.01); *G02C 2200/08* (2013.01)

(58) Field of Classification Search
CPC ........ G02C 2200/02; G02C 5/14; G02C 5/22; G02C 5/143
USPC .............................. 351/116, 153, 111; 16/228
See application file for complete search history.

(56) References Cited

U.S. PATENT DOCUMENTS

| 3,422,449 | A | * | 1/1969 | Rinnman | G02C 5/2272 |
| | | | | | 351/120 |
| 5,321,442 | A | * | 6/1994 | Albanese | G02C 1/06 |
| | | | | | 351/154 |
| 6,217,170 | B1 | * | 4/2001 | Hsiao | G02C 5/22 |
| | | | | | 16/228 |
| 6,231,181 | B1 | * | 5/2001 | Swab | G02C 5/146 |
| | | | | | 351/116 |
| 7,497,571 | B2 | * | 3/2009 | Rossin | G02C 5/22 |
| | | | | | 16/228 |
| 7,794,080 | B2 | * | 9/2010 | Zelazowski | G02C 5/2209 |
| | | | | | 16/228 |
| 7,815,306 | B2 | * | 10/2010 | Xiao | G02C 1/08 |
| | | | | | 351/111 |
| 8,292,427 | B2 | * | 10/2012 | Zelazowski | G02C 1/08 |
| | | | | | 351/136 |
| 2009/0195747 | A1 | * | 8/2009 | Insua | G02C 5/146 |
| | | | | | 351/116 |
| 2012/0176579 | A1 | * | 7/2012 | Alford | G02C 3/04 |
| | | | | | 351/116 |
| 2014/0104562 | A1 | * | 4/2014 | Kim | G02C 5/146 |
| | | | | | 351/116 |
| 2014/0226120 | A1 | * | 8/2014 | Chen | G02C 5/2209 |
| | | | | | 351/116 |

(Continued)

FOREIGN PATENT DOCUMENTS

| JP | 2007-86696 | * | 4/2007 | ............... G02C 5/14 |
| JP | 2008-129566 | | 5/2008 | |

(Continued)

*Primary Examiner* — Hung Dang
(74) *Attorney, Agent, or Firm* — Law Offices of Steven W. Weinrieb (57) ABSTRACT

An eyeglasses assembly comprises a frame member and a pair of temple or side pieces. The temple or side pieces are structurally connected to end or side portions of the frame member by first and second male and female connector members integrally formed upon the frame member and the temple or side pieces and without the need for auxiliary fasteners. In addition, first and second magnetic members are mounted within recessed portions of the temple or side pieces and the frame member such that when the temple or side pieces are disposed at their fully open or unfolded positions with respect to the frame members, the magnetic members maintain the temple or side members at the fully open or unfolded positions.

6 Claims, 5 Drawing Sheets

(56) References Cited

U.S. PATENT DOCUMENTS

| | | | | |
|---|---|---|---|---|
| 2015/0301359 A1* | 10/2015 | Lipawsky | ............... | G02C 3/003 |
| | | | | 351/116 |
| 2015/0309331 A1* | 10/2015 | Poole | ....................... | G02C 7/10 |
| | | | | 351/116 |
| 2015/0338678 A1* | 11/2015 | Fafaul | ...................... | G02C 1/06 |
| | | | | 351/86 |

FOREIGN PATENT DOCUMENTS

| | | | | | |
|---|---|---|---|---|---|
| JP | 2008-129566 | * | 6/2008 | ............... | G02C 5/22 |
| JP | 2015-18199 | * | 1/2015 | ............... | G02C 5/22 |
| WO | WO 2014/111966 | | 7/2014 | | |
| WO | WO2014/111966 | * | 7/2017 | ............... | G02C 5/22 |

* cited by examiner

EYEGLASSES ASSEMBLY COMPRISING FRAME AND INTERCHANGEABLE SIDE PIECES

FIELD OF THE INVENTION

The present invention relates generally to eyeglasses, and more particularly to a new and improved eyeglasses assembly wherein the pair of oppositely disposed side or temple pieces of the eyeglasses are easily interchangeable as a result of end portions of the side or temple pieces being snap-fitted onto oppositely disposed vertically oriented posts integrally incorporated into opposite side portions of the eyeglasses frame member, and wherein further, the opposite side portions of the eyeglasses frame member and the end portions of the side or temple pieces have magnets incorporated therewithin so as to maintain the side or temple pieces at their open positions relative to the eyeglasses frame member.

BACKGROUND OF THE INVENTION

The prior art with respect to eyeglasses is replete with numerous patents and patent application publications which demonstrate various means for easily and interchangeably attaching side or temple pieces of the eyeglasses assembly to the eyeglasses frame member. One interesting example of such an eyeglasses assembly may be found within U.S. Pat. No. 8,292,427 which issued to Zelazowski on Oct. 23, 2012 wherein, basically, the side or temple pieces and the frame member of the eyeglasses assembly are effectively secured together in an easy and interchangeable manner as a result of cylindrical magnets being incorporated within end portions of the side or temple pieces and the frame member of the eyeglasses assembly. When the magnets are disposed within close proximity to each other, the magnetic attraction developed between the magnets then secure the temple or side pieces to the frame member of the eyeglasses assembly. A somewhat similar system is likewise disclosed within U.S. Pat. No. 6,217,170 which issued to Hsiao on Apr. 17, 2001. Furthermore, United States Patent Publication 2015/0337678 which was filed by Fafaul et al. and which was published on Nov. 26, 2015, also discloses an eyeglasses frame assembly wherein the side or temple pieces are secured in part by means of magnetic pieces having opposite magnetic polarities, as well as male and female portions of the side or temple pieces and the frame member of the eyeglasses assembly, mating with each other.

Still further, United States Patent Application Publication 2015/0301359 which was filed by Lipawsky and published on Oct. 22, 2015, discloses a similar arrangement wherein, however, the cooperating magnets are effectively rectangular plates which are disposed in an overlapping relationship with respect to each other when the side or temple pieces are insertably mounted within socket portions of members independently pivotally mounted upon the frame member of the assembly. A similar arrangement is disclosed within Japanese Patent Publication 2007-86696 which was published on Apr. 5, 2007. Yet further, United States Patent Application Publication 2014/0226120 which was filed by Chen and which was published on Aug. 14, 2014 discloses yet another variant of magnetic members, having opposite polarities, securing temple or side pieces to extension members of the frame member of the eyeglasses assembly. Still yet further, United States Patent Application Publication 2012/0176579 which was filed by Alford and which was published on Jul. 12, 2012 discloses an eyeglasses assembly wherein the side or temple pieces are mounted upon the frame member of the eyeglasses assembly by means of attractive magnetic pieces, however, it does not appear that the side or temple pieces are pivotally mounted upon the frame member of the eyeglasses assembly. To the contrary, the temple or side pieces are structured so as to be removable from the frame member of the eyeglasses assembly and to then effectively form a compartment within which the frame member of the eyeglasses assembly is adapted to be accommodated for protective purposes. Lastly with respect to these types of eyeglasses assemblies, United States Patent Application Publication 2009/0195747, which was filed by Insua and which was published on Aug. 6, 2009, discloses an assembly wherein the temple or side pieces are inserted into socket members that are, in turn, pivotally mounted upon the frame member of the eyeglasses assembly.

Another interesting type of eyeglasses frame assembly, wherein the side or temple pieces of the assembly are easily and quickly interchangeably mounted upon the frame member of the assembly, is found within United States Patent Application Publication 2015/0309331 which was filed by Poole and which was published on Oct. 29, 2015. This patent application publication discloses a mechanical interlocking arrangement between the side or temple pieces and the frame member of the assembly but does not disclose any magnetic fixation of the side or temple pieces to the frame portion of the assembly.

Still another interesting example of an eyeglasses assembly may be found within International Patent Application Publication WO 2014/111966 which was filed by Soppelsa and which was published on Jul. 24, 2014. In accordance with this assembly, the temple or side pieces of the assembly are mounted upon the frame member of the assembly by means of magnetically attractive components but the assembly also requires a separate multi-component snap-fitted mounting bar and plug arrangement for structurally mounting the temple or side pieces of the assembly upon the frame portion of the assembly.

Yet another interesting example of an eyeglasses assembly may be found within Japanese Patent Application Publication 2015-18199 which was published on Jan. 29, 2015. In accordance with this assembly, the temple or side pieces of the assembly are mounted upon the frame member of the assembly solely by means of magnetically attractive components. However, there is no structural interconnection between the temple or side pieces of the assembly and the frame member of the assembly.

A need therefore exists in the art for a new and improved eyeglasses assembly wherein the temple or side pieces are not only pivotally attached to side portions of the frame member of the assembly by means of a structural subassembly which permits the temple or side pieces to be quickly, easily, and securely mounted upon the side portions of the frame member, as well as to be quickly and easily removable from the side portions of the frame member, so as to enable the temple or side pieces to be readily interchangeable as may be desired or required, and without the need for auxiliary fasteners, but in addition, a magnetic subassembly which is to also be incorporated within the assembly so as to enable the temple or side pieces to effectively be locked into or at their open or unfolded positions with respect to the frame member of the assembly whereby the eyeglasses assembly can be readily mounted upon a person's head.

Overall Objectives of the Present Invention

The overall objectives of the present invention is to provide a new and improved eyeglasses assembly wherein the temple or side pieces are not only pivotally attached to side portions of the frame member of the assembly by means of a structural subassembly which permits the temple or side pieces to be quickly, easily, and securely mounted upon the side regions of the frame portion, as well as to be quickly and easily removable from the side regions of the frame portion, so as to enable the temple or side pieces to be readily interchangeable as may be desired or required without the need for auxiliary fasteners, but in addition, a magnetic subassembly is to be incorporated within the assembly so as to enable the temple or side pieces to effectively be locked into or at their open or unfolded positions with respect to the frame member of the assembly whereby the eyeglasses assembly can be readily mounted upon a person's head.

SUMMARY OF THE INVENTION

The foregoing and other objectives are achieved in accordance with the teachings and principles of the present invention through the provision of a new and improved eyeglasses assembly wherein, for example, the oppositely disposed side portions of the frame member of the assembly are integrally provided with vertically oriented cylindrical male connector bars or posts, while the end portions of the temple or side pieces of the assembly, that are adapted to be mated with or mounted upon the oppositely disposed side portions of the frame member of the assembly, are integrally provided with substantially U-shaped female connector portions for accommodating the cylindrical bars or posts of the frame member in a snap-fitted manner. In this manner, the temple or side pieces can be easily and quickly mounted upon and removed from the opposite sides or ends of the frame member without the need for auxiliary fasteners. In addition, the U-shaped female connector portions of the two temple or side pieces and the cylindrical male connector bars or posts of the frame member define pivotal connections so that the temple or side pieces can be pivotally moved between open or unfolded and closed or folded positions. Still further, the endmost regions of the end portions of the side or temple pieces are also provided with first magnetic members while the side or end portions of the frame member are provided with second magnetic members. Accordingly, when the temple or side pieces are mounted upon the frame member of the eyeglasses assembly and are moved to their fully open or unfolded positions in preparation for mounting the eyeglasses assembly upon a person's head, the first and second magnetic members, having opposite magnetic polarities, will be attracted to each other thereby effectively locking or retaining the temple or side pieces of the assembly at their open or unfolded positions.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
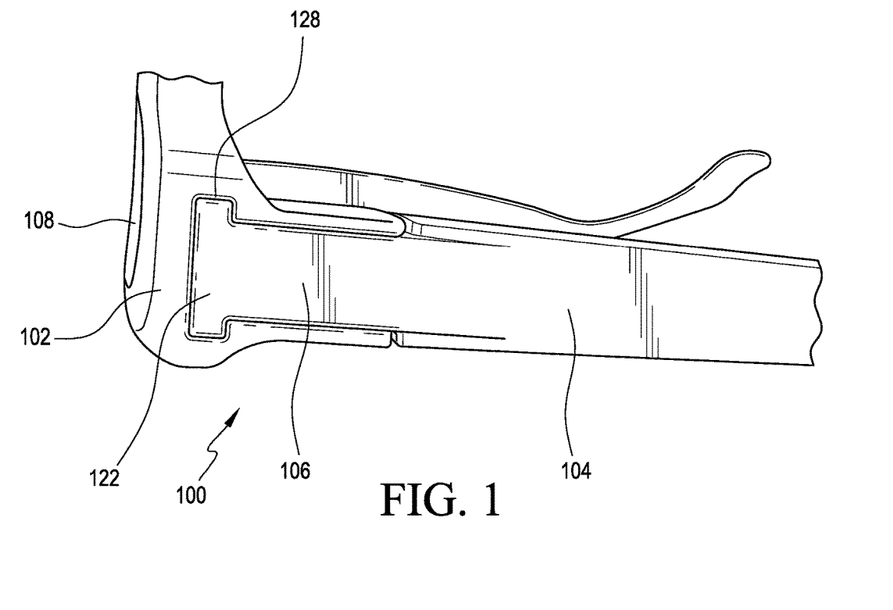
FIG. 1 is a side elevational view of the new and improved eyeglasses assembly as constructed in accordance with the principles and teachings of the present invention and showing one of the temple or side pieces of the eyeglasses assembly attached to the frame member of the assembly and from an observational perspective oriented in the direction extending from an external point of view toward an internal portion of the eyeglasses assembly.
Figure 2:
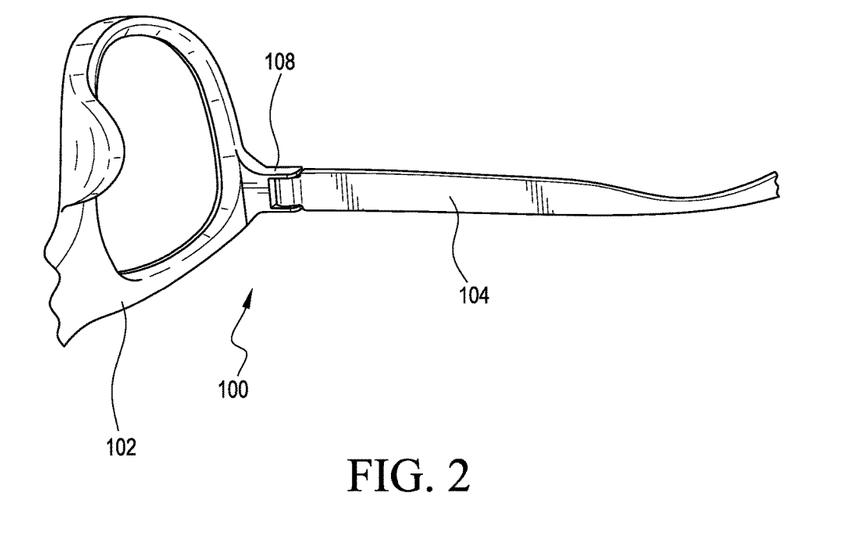
FIG. 2 is a side elevational view of the new and improved eyeglasses assembly as constructed in accordance with the principles and teachings of the present invention, and similar to that of FIG. 1, except that FIG. 2 shows one of the temple or side pieces of the assembly attached to the frame member of the eyeglasses assembly from an observational perspective oriented in the direction extending from an internal point of view toward an external portion of the eyeglasses assembly.
Figure 3:
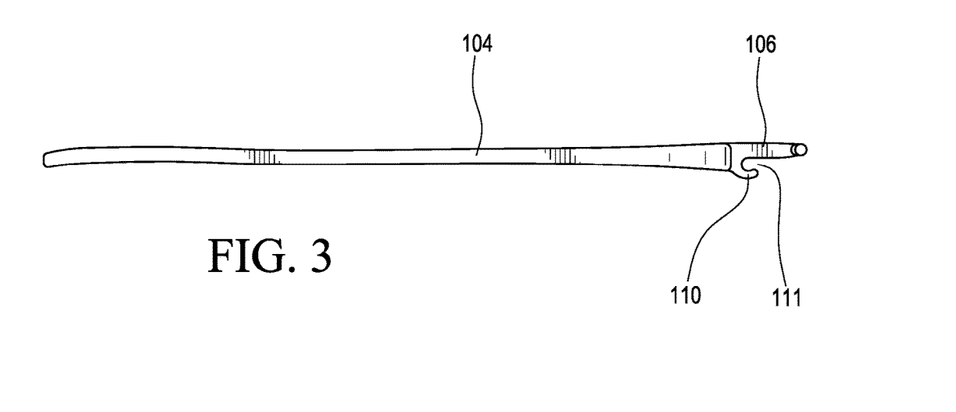
FIG. 3 is a top plan view of one of the temple or side pieces of the eyeglasses assembly showing the female connector member of the temple or side piece integrally incorporated within an end portion of the temple or side piece.
Figure 4:
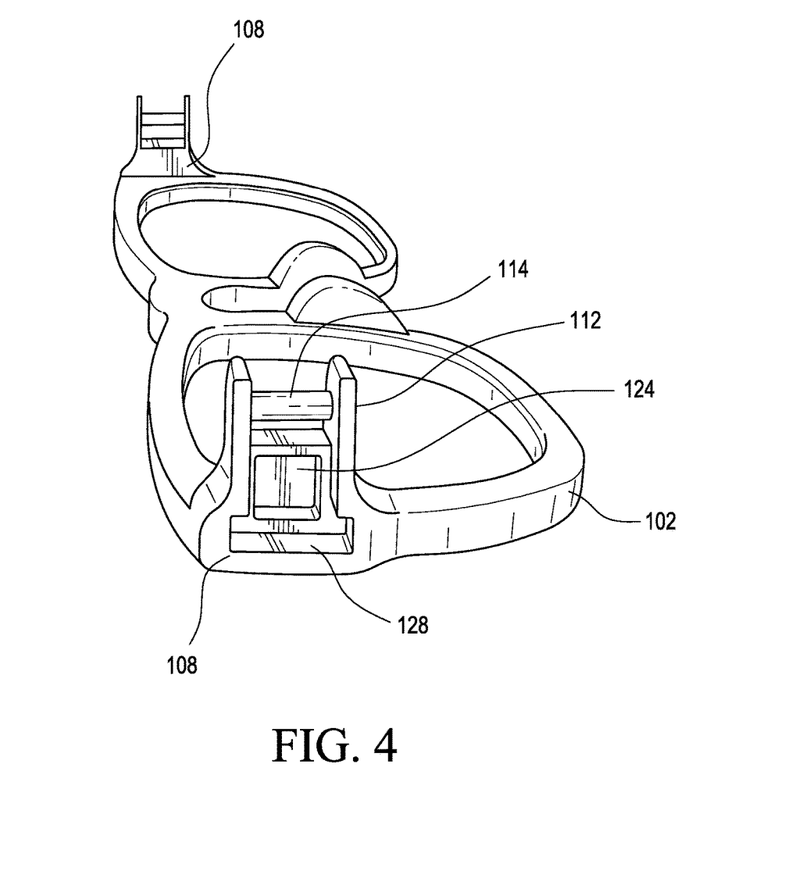
FIG. 4 is a perspective view of the frame portion of the eyeglasses assembly showing the disposition of the male connector members integrally formed upon opposite end or side portions of the frame member of the eyeglasses assembly.
Figure 5:
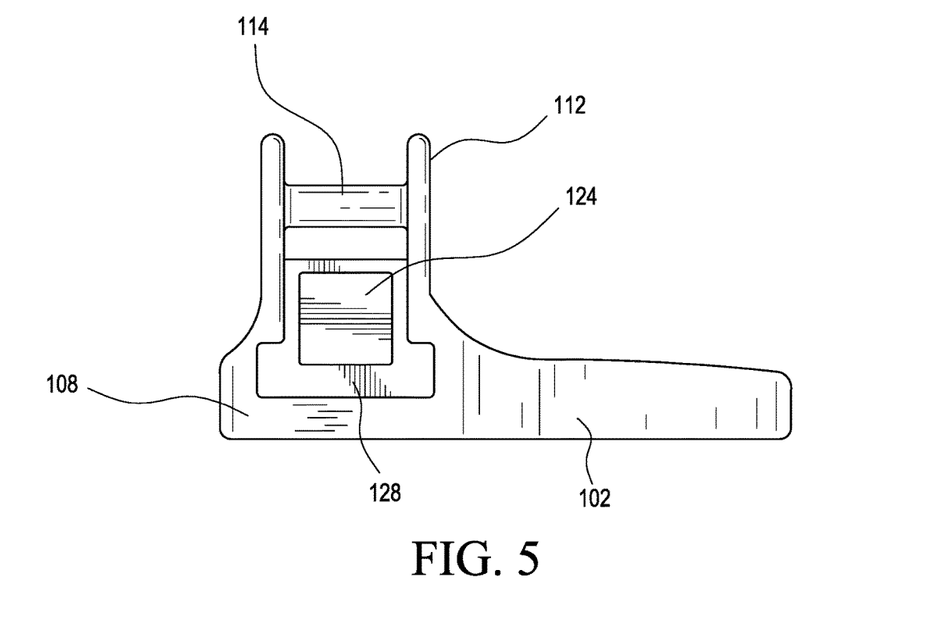
FIG. 5 is an enlarged side elevational view of one end portion of the frame member of the eyeglasses assembly, corresponding to the frame member as illustrated within FIG. 4, showing one of the male connector members integrally formed upon one of the opposite end or side portions of the frame member of the eyeglasses assembly.
Figure 6:
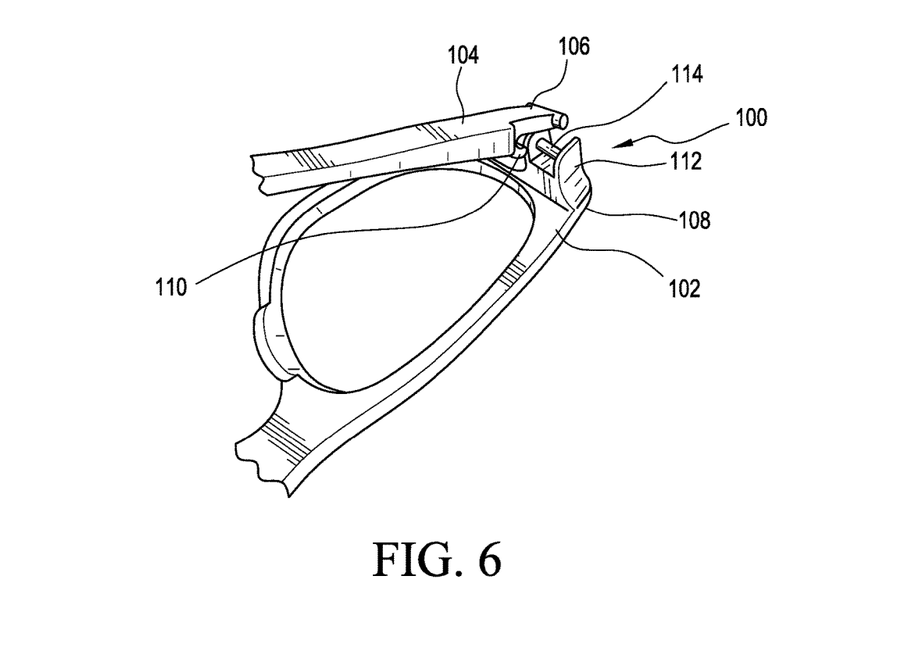
FIG. 6 is a perspective view of one of the temple or side pieces of the eyeglasses assembly about to be structurally connected to one end or side portion of the frame member of the eyeglasses assembly as a result of the female connector member, integrally formed upon one end portion of the temple or side piece, being snap-fitted onto the male connector member integrally formed upon one end or side portion of the frame member of the eyeglasses assembly.

Referring now to the drawings, and more particularly to FIGS. 1 and 2 thereof, the new and improved eyeglasses assembly is disclosed and is generally indicated by the reference character 100. More particularly, it can clearly be seen that the new and improved eyeglasses assembly 100 is seen to comprise a frame member 102 and a pair of temple or side pieces 104, although only one of the pair of temple or side pieces 104 is illustrated within FIGS. 1 and 2. As will become more apparent hereinafter, it is to be noted that the pair of temple or side pieces 104 are adapted to be both structurally connected to the frame member 102 by means of male and female connector members formed upon end portions of the temple or side pieces and the frame member, as well as magnetically connected to the frame member 102 by means of first and second magnetic members mounted within the end portions of the temple or side pieces and the opposite end or side portions of the frame member 102, and this structurally and magnetically connected state, as defined between the pair of temple or side pieces with respect to the opposite side or end portions of the frame member 102, is in fact disclosed within FIGS. 1 and 2.

More particularly, with reference now being additionally made to FIGS. 3-6, each one of the temple or side pieces 104 has a proximal end portion 106 that is adapted to be connected to a respective opposite side or end portion 108 of the frame member 102 as can be seen in FIGS. 1 and 2. The proximal end portion 106 of each temple or side piece 104 is seen to have a female connector member 110 integrally formed upon an inner side surface portion of the side or temple piece 104, and it is to be appreciated that the female connector member 110 has a substantially C-shaped cross-sectional configuration so as to effectively define a substantially C-shaped socket or recessed portion 111. In this manner, as will become more apparent, the female connector 110 of each temple or side piece can be quickly and easily mounted upon, or removed from, a respective side or end portion 108 of the frame member 102, in a snap-fitted manner as a result of being engaged with, or disengaged from, a male connector member of the frame member 102. Along these lines, and as can best be appreciated from FIGS. 4 and 5, each oppositely disposed side or end portion 108 is provided with a substantially H-shaped male connector structure 112 which extends vertically upwardly as viewed within FIGS. 4 and 5, but in reality, that is, in use, when the eyeglasses assembly 100 is disposed upon a person's head, the male connector structure 112 will effectively extend horizontally. It is also to be appreciated that within the substantially H-shaped male connector structure 112, a cylindrical post or cross-bar 114 of the substantially H-shaped male connector structure effectively defines a male connector member 116. This male connector member 116 is adapted to be inserted, in a snap-fitted manner, within the substantially C-shaped slot 111 of the female connector member 110 as may be appreciated from FIG. 6, it being appreciated still further, for example, that the diametrical extent of the cylindrical post or crossbar 114 is slightly less than the diametrical extent of the substantially C-shaped slot 111 of the female connector member 110 but is slightly larger than the open mouth or distal lip portion of the substantially C-shaped slot 111 so as to achieve the snap-fitted connection between the male connector member 114 and the female connector member 110. In this manner, the pair of temple or side pieces 104 are able to be easily and quickly mounted upon, and removed from, the opposite end or side portions of the frame member 102 without the need for any auxiliary fasteners. Still further, as has been previously noted, when the eyeglasses assembly 100 is disposed upon a person's head, the cylindrical cross-bar or post 114, defining the male connector, will be oriented vertically, and therefore it can be further appreciated that the cylindrical post or cross-bar 114 defines a vertically oriented pivotal axis about which each one of the temple or side pieces 104 can be rotated from an open or unfolded position to a closed or folded position, or vice versa, as may be desired, with respect to the frame member 102.

Figure 7:
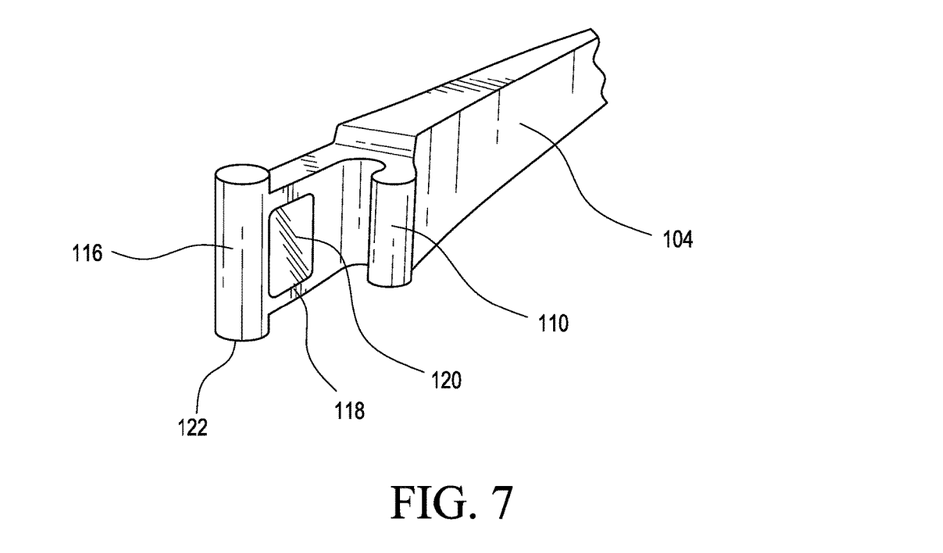
FIG. 7 is a perspective view of one of the temple or side pieces of the eyeglasses assembly, as shown in FIG. 3, showing the female connector member of the temple or side piece integrally incorporated within an end portion of the temple or side piece as well as a first magnetic member mounted within the endmost portion of the temple or side piece of the eyeglasses assembly.
Figure 8:
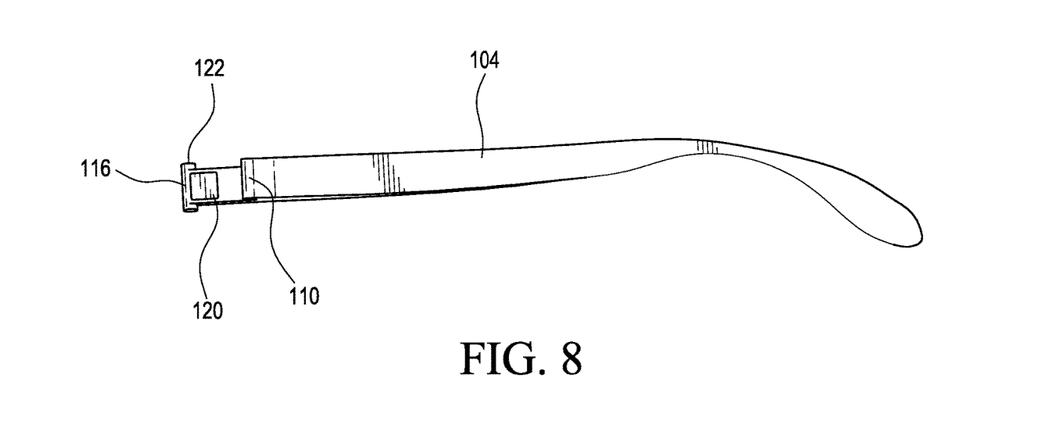
FIG. 8 is a side elevational view of the temple or side piece of the eyeglasses assembly, and corresponding to the temple or side piece as illustrated within FIG. 7, showing the disposition of the first magnetic member mounted within the endmost portion of the temple or side piece of the eyeglasses assembly.
Figure 9:
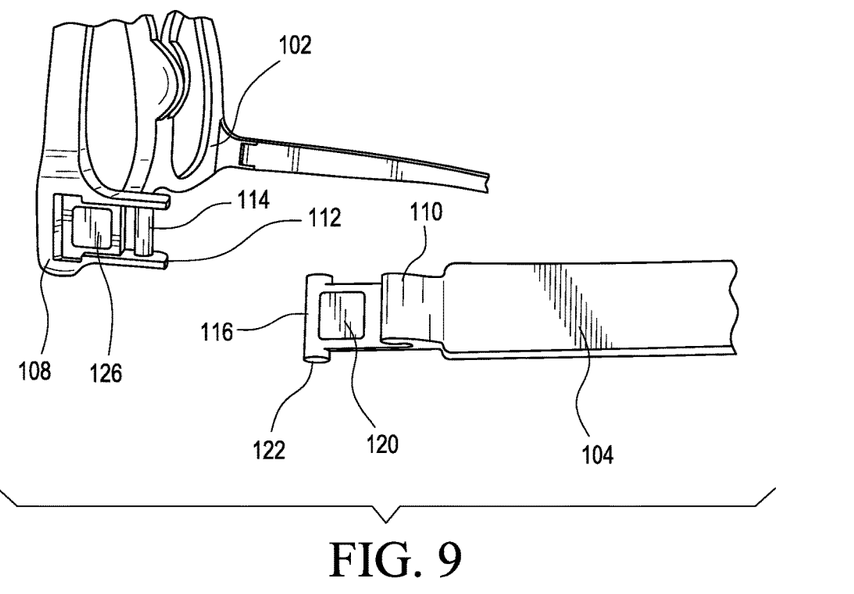
FIG. 9 is a side elevational view of one of the temple or side pieces of the eyeglasses assembly disposed adjacent to one of the end or side portions of the frame member of the eyeglasses assembly prior to the mounting of the temple or side piece upon the frame member of the eyeglasses assembly, as illustrated within FIG. 6, and showing the provision of the first magnetic member mounted within the endmost portion of the temple or side piece as well as a second magnetic member mounted within one of the end or side portions of the frame member of the eyeglasses assembly.

Continuing further, and with reference now being made to FIGS. 7 and 8, it is further seen that a substantially T-shaped endmost portion 116 of each temple or side piece 104, which is located upon the external side portion of each temple or side piece 104 and which extends longitudinally beyond the internally located female connector member 110, is provided with a substantially square-shaped recessed portion 118 within which a first magnetic member 120 is fixedly disposed. While the first magnetic member 120 is shown as having a substantially square-shaped configuration, the first magnetic member 120 can of course have configurations other than square, such as, for example, circular, rectangular, or any other geometrical configuration. The endmost portion 116 of each temple or side piece 104 also includes a cylindrical head portion 122 which effectively forms the crossbar of the T-shaped endmost portion 116. In a similar or corresponding manner, and as can best be appreciated from FIGS. 4,5,9, and 10, the substantially H-shaped male connector structure 112 is seen to likewise have defined within a lower or forward external end portion thereof a square-shaped recess or pocket 124 within which a second magnetic member 126 is to be fixedly connected. As was the case with the first magnetic member 120, while the second magnetic member 126 is shown as having a substantially square-shaped configuration, the second magnetic member 126 can of course have configurations other than square, such as, for example, circular, rectangular, or any other geometrical configuration.

Figure 10:
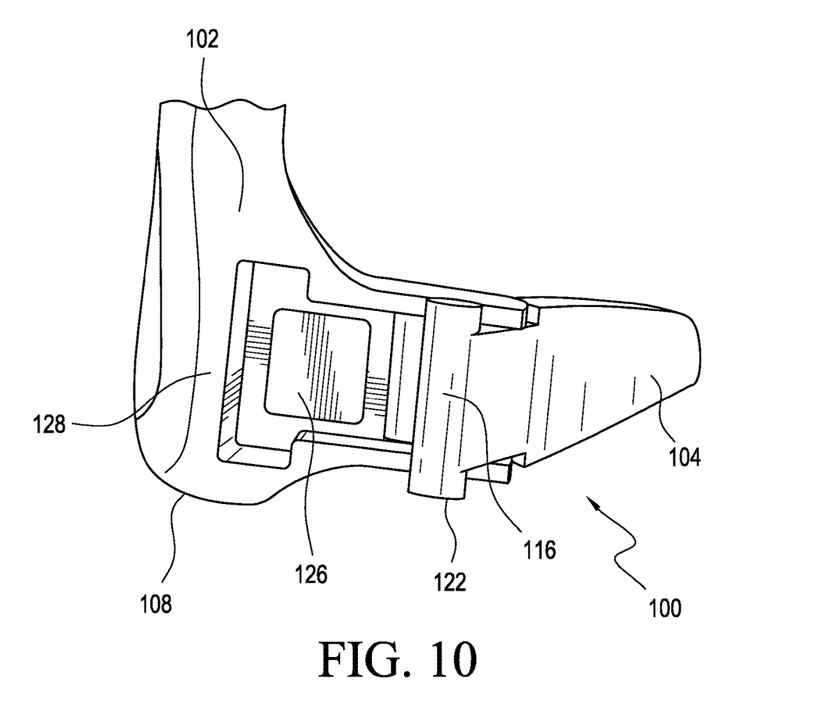
FIG. 10 is a side elevational view of one of the temple or side pieces of the eyeglasses assembly structurally mounted upon one of the end or side portions of the frame member of the eyeglasses assembly but disposed at its closed or folded position such that the first magnetic member mounted within the endmost portion of the temple or side piece is not magnetically engaged with the second magnetic member mounted within the end or side portion of the frame member of the eyeglasses assembly.

The first and second magnet members 120,126 will have opposite polarities, and therefore, as can best be appreciated from FIG. 10, which illustrates one of the temple or side piece 104 being pivotally connected to one end portion 108 of the frame member 102 of the eyeglasses assembly 100 and yet disposed at its closed or folded position, when that temple or side piece 104 is pivotally moved from the illustrated closed or folded position to the open or unfolded position, the first and second magnetic members 120,126 will be disposed in close proximity to each other whereby the magnetic attraction developed between the first and second magnetic members 120,126 will serve to maintain the temple or side 104 at its open or unfolded position. It is lastly noted, with reference again being made to FIGS. 1,4,5,9, and 10, that the external side portion of the lower or forward end portion of the of the substantially H-shaped male connector structure 112 is also provided with a transversely oriented elongated slot or recess 128 that accommodates the head portion 122 of the temple or side piece 104 when the side or temple piece 104 has been pivoted to its fully open or unfolded position and has effectively been locked in place by means of the magnetic attractive forces developed between the first and second magnetic member 120,126. In this manner, the external surface portion of each temple or side piece 104 is effectively coplanar or flush with the external side or end surface of the side or end portion 108 of the frame member 102 as can be appreciated from, for example, FIG. 1.

Thus, it may be seen that in accordance with the principles and teachings of the present invention, there has been provided a new and improved eyeglasses assembly wherein the oppositely disposed side portions of the frame member of the assembly are integrally provided with vertically oriented cylindrical male connector bars or posts, while the end portions of the temple or side pieces of the assembly, that are adapted to be mated with or mounted upon the oppositely disposed side portions of the frame member of the assembly, are integrally provided with substantially U-shaped female connector portions for accommodating the cylindrical bars or posts of the frame member in a snap-fitted manner so that together, the U-shaped female connector portions of the two temple or side pieces and the cylindrical male connector bars or posts of the frame member, define pivotal connections so that the temple or side pieces can be pivotally moved between open or unfolded and closed or folded positions. In addition, the endmost regions of the end portions of the temple or side pieces are also provided with first magnetic members while the side portions of the frame member are provided with second magnetic members. Accordingly, when the temple or side pieces are mounted upon the
frame member of the eyeglasses assembly and are moved to their fully open or unfolded positions in preparation for mounting the eye-glasses assembly upon a person's head, the first and second magnetic members, having opposite magnetic polarities, will be attracted to each other thereby effectively locking or retaining the temple or side pieces of the assembly at their open or unfolded positions.

Obviously, many variations and modifications of the present invention are possible in light of the above teachings. It is therefore to be understood that within the scope of the appended claims, the present invention may be practiced otherwise than as specifically described herein.

KEY TO REFERENCE NUMBERS IN THE DRAWINGS

100—EYEGLASSES ASSEMBLY
102—FRAME MEMBER OF 100
104—TEMPLE OR SIDE PIECE OF 100
106—PROXIMAL END PORTION OF 104
108—SIDE OR END PORTION OF 102
110—FEMALE CONNECTOR MEMBER OF 104
111—C-SHAPED SOCKET/RECESS OF 110
112—H-SHAPED MALE CONNECTOR STRUCTURE
114—CROSS-BAR MALE CONNECTOR OF 112
116—T-SHAPED ENDMOST PORTION OF 104
118—SQUARE-SHAPED RECESS OF 116
120—FIRST MAGNETIC MEMBER
122—CYLINDRICAL HEAD PORTION OF 116
124—SQUARE-SHAPED RECESS IN 112
126—SECOND MAGNETIC MEMBER 126 IN 124
128—RECESS IN 112 FOR ACCOMMODATING 122

What is claimed as new and desired to be protected by Letters Patent of the United States of America, is:

1. An eyeglasses assembly, comprising:
a frame member;
a pair of temple side pieces; and
a pair of male connector members and a pair of female connector members integrally mounted upon said frame member and said pair of temple side pieces for structurally mounting said pair of temple sides pieces in a snap-fitted pivotal manner upon said frame member such that said pair of temple side pieces can be easily and quickly mounted upon and removed from said frame member, without the need for auxiliary fasteners, so as to render said temple side pieces readily interchangeable,
wherein said pair of male connector members each comprise a vertically oriented cylindrical post defined around a vertically oriented axis and said female connector members each comprise a connector having a substantially C-shaped recessed socket formed therein wherein the diametrical extent of each one of said cylindrical posts is slightly less than the diametrical extent of each one of said substantially C-shaped recessed sockets formed within said female connector members so as to permit said female connector members to accommodate and pivot around said vertically oriented cylindrical posts of said male connector members so as to permit said temple side pieces to move between open unfolded positions and closed folded positions with respect to said frame member, but is slightly larger than open mouth portions of said substantially C-shaped recessed sockets so as to achieve said snap-fitted connections between said pair of male and female connector members.

2. The assembly as set forth in claim 1, wherein:
each one of said male connector members comprises a male connector member mounted upon opposite side ends of said frame member; and
each one of said female connector members comprises a female connector member mounted upon end portions of each one of said pair of temple side pieces so as to permit said pair temple side pieces to be connected to said opposite side ends of said frame member.

3. An eyeglasses assembly comprising:
a frame member;
a pair of temple side pieces;
male and female connector members integrally mounted upon said frame member and said pair of temple side pieces for structurally mounting said pair of temple sides pieces upon said frame member such that said pair of temple side pieces can be easily and quickly mounted upon and removed from said frame member, without the need for auxiliary fasteners, so as to render said temple side pieces readily interchangeable,
first magnetic members, having a first magnetic polarity, respectively disposed within said end portions of said temple side pieces; and
second magnetic members, having a second magnetic polarity opposite said first magnetic polarity of said first magnetic members, respectively disposed within said opposite side end portions of said frame member,
whereby when said temple side members are mounted upon said opposite side ends of said frame member and said temple side pieces are pivotally moved toward said open unfolded positions, the magnetic attraction developed between said first and second magnetic members having said opposite magnetic polarities will cause said first and second magnetic members to be attracted toward each other and thereby retain said temple side pieces at their open unfolded positions.

4. The assembly as set forth in claim 3, wherein:
a first recess is defined within each one of said temple side pieces so as to accommodate each one of said first magnetic members; and a second recess is defined within each opposite side end of said frame member for respectively accommodating each one of said second magnetic members.

5. The assembly as set forth in claim 3, wherein:

said first and second magnetic members have predetermined geometrical configurations.

6. The assembly as set forth in claim 5, wherein:

said geometrical configurations of said first and second magnetic members are selected from the group comprising a square, a circle, and a rectangle.

* * * * *